United States Patent
Gu et al.

(10) Patent No.: US 10,380,074 B1
(45) Date of Patent: Aug. 13, 2019

(54) SYSTEMS AND METHODS FOR EFFICIENT BACKUP DEDUPLICATION

(71) Applicant: Symantec Corporation, Mountain View, CA (US)

(72) Inventors: Lei Gu, Bedford, MA (US); Jason Holler, Reston, VA (US); Nathan Rivers, Hamilton, VA (US); Elton Inada, Coronado, CA (US); Riti Saxena, Sunnyvale, CA (US); Kirill Levichev, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 783 days.

(21) Appl. No.: 14/992,237

(22) Filed: Jan. 11, 2016

(51) Int. Cl.
*G06N 20/00* (2019.01)
*G06F 16/174* (2019.01)

(52) U.S. Cl.
CPC ......... *G06F 16/1752* (2019.01); *G06N 20/00* (2019.01)

(58) Field of Classification Search
USPC .......................................................... 706/12
See application file for complete search history.

(56) References Cited

U.S. PATENT DOCUMENTS

| | | | | |
|---|---|---|---|---|
| 8,140,491 B2* | 3/2012 | Mandagere | ....... | G06F 17/30598 707/692 |
| 8,463,235 B1* | 6/2013 | Antonov | ............... | H04M 3/436 455/410 |
| 9,749,299 B1* | 8/2017 | Sokolov | .............. | H04L 63/0428 |
| 9,788,160 B1* | 10/2017 | Gu | ......................... | H04W 4/021 |
| 9,794,744 B1* | 10/2017 | Gu | ......................... | H04W 4/021 |
| 9,882,889 B1* | 1/2018 | Gu | ..................... | H04L 63/0823 |
| 9,883,339 B1* | 1/2018 | Gu | ......................... | H04W 4/021 |
| 10,009,425 B1* | 6/2018 | Shavell | .................... | H04L 67/42 |
| 10,032,033 B2* | 7/2018 | Gu | ...................... | G06F 11/1451 |
| 10,061,916 B1* | 8/2018 | Jiang | ....................... | G06F 21/50 |
| 10,078,762 B1* | 9/2018 | Gu | ......................... | G06F 21/629 |
| 10,097,560 B1* | 10/2018 | Shavell | ................. | H04L 63/107 |
| 10,204,499 B1* | 2/2019 | Newstadt | ........... | G08B 21/0261 |
| 10,206,110 B1* | 2/2019 | Shavell | ................. | H04W 12/08 |
| 2015/0142755 A1* | 5/2015 | Kishi | ...................... | G06F 12/04 707/692 |

OTHER PUBLICATIONS

ACM a Quantitative and Comparative Study of Network-Level Efficiency for Cloud Storage Services, Zhenhua Li, Yongfeng Zhang, Yunhao Liu, Tianyin Xu, Ennan Zhai, Yao Liu, Xiaobo Ma, Zhenyu Li ACM Transactions on Modeling and Performance Evaluation of Computing Systems (TOMPECS) vol. 4, Issue 1 2019 pp. 1-32.*

* cited by examiner

*Primary Examiner* — Michael B Holmes
(74) *Attorney, Agent, or Firm* — FisherBroyles, LLP

(57) ABSTRACT

A computer-implemented method for efficient backup deduplication may include (1) identifying a file to be divided into chunks for deduplication, (2) requesting, from a server, a chunk size to use when dividing the file for deduplication by submitting at least one attribute of the file to the server, the server selecting the chunk size based at least in part on a projected chunk reuse rate when the file is deduplicated according to the chunk size, (3) receiving from the server, in response to requesting the chunk size, the chunk size to use when dividing the file for deduplication, and (4) dividing the file for deduplication into a plurality of chunks according to the chunk size. Various other methods, systems, and computer-readable media are also disclosed.

20 Claims, 7 Drawing Sheets

SYSTEMS AND METHODS FOR EFFICIENT BACKUP DEDUPLICATION

BACKGROUND

To protect against data loss, an organization may use a backup system to back up important data. In order to reduce the resources required to store backup images, the organization may store backup images within deduplicating data systems.

Deduplicating data systems are often able to reduce the amount of storage space needed to store files by recognizing redundant data patterns. For example, a conventional deduplicating data system may reduce the amount of storage space needed to store similar files by dividing the files into data segments and storing only unique data segments. In this example, each deduplicated file stored within the deduplicating data system may be represented by a list of references to those data segments that make up the file.

Unfortunately, deduplication operations may involve significant overhead. For example, tracking a large number of small data segments may consume additional storage and may consume more client-side processing resources. Increasing the size of the data segments may reduce overhead, but may also reduce the number of reusable data segments, thereby reducing the overall efficacy of deduplication. Thus, data segments that are too large or that are too small may negatively impact the consumption of computing resources.

Accordingly, the instant disclosure identifies and addresses a need for additional and improved systems and methods for efficient backup deduplication.

SUMMARY

As will be described in greater detail below, the instant disclosure generally relates to systems and methods for efficient backup deduplication by selecting deduplication chunk sizes for backup files to be deduplicated based on attributes of the backup files (e.g., using machine learning systems to determine optimal deduplication chunk sizing for files of given attributes). In some examples, these systems and methods may gather information about deduplication efficacy of files with given attributes at various chunk sizes from various disparate client systems.

In one example, a computer-implemented method for efficient backup deduplication may include (1) identifying a file to be divided into chunks for deduplication, (2) requesting, from a server, a chunk size to use when dividing the file for deduplication by submitting at least one attribute of the file to the server, the server selecting the chunk size based at least in part on a projected chunk reuse rate when the file is deduplicated according to the chunk size, (3) receiving from the server, in response to requesting the chunk size, the chunk size to use when dividing the file for deduplication, and (4) dividing the file for deduplication into a group of chunks according to the chunk size.

In some examples, selecting the chunk size based at least in part on the projected chunk reuse rate when the file is deduplicated according to a selection scheme that maximizes the projected chunk reuse rate given a maximum chunk size and that maximizes the chunk size given a maximum projected chunk reuse rate.

In some examples, selecting the chunk size based at least in part on the projected chunk reuse rate may include (1) identifying a first priority assigned to increasing the projected chunk reuse rate, (2) identifying a second priority assigned to increasing the chunk size, and (3) selecting the chunk size based on maximizing a combination of the first priority and the second priority.

In some examples, selecting the chunk size based at least in part on the projected chunk reuse rate may include: submitting the attribute of the file to a machine learning system that has been trained with a group of samples, each sample including an attribute of a corresponding sample file that corresponds to the attribute of the file, a chunk size used for dividing the corresponding sample file for deduplication, and a chunk reuse rate resulting from deduplicating the corresponding sample file using the chunk size and receiving, from the machine learning system, a recommendation indicating the chunk size.

In one embodiment, the samples used to train the machine learning system originate from a group of subscribers to a deduplication service that may include the machine learning system.

In one embodiment, the deduplication service obtained the samples at least in part by assigning differing chunk sizes to the subscribers for use in dividing files with attributes that correspond to the attribute of the file.

In one embodiment, the attribute may include (1) a file type of the file, (2) an application that created the file, and/or (3) an application that uses the file. In one embodiment, the attribute may include a size of the file.

In some examples, the computer-implemented method may further include backing up the file by submitting at least a portion of the chunks to a deduplicating storage system.

In one embodiment, the deduplicating storage system determines, based on backing up the file, a chunk reuse rate of the file and uses the chunk reuse rate to calculate a projected chunk reuse rate for an additional file based on an attribute of the additional file that corresponds to the attribute of the file.

In one embodiment, the computer-implemented method may further include (1) determining that a size of the file has increased after backing up the file, (2) in response to determining that the size of the file has increased (i) requesting a new chunk size for dividing the file for deduplication and (ii) performing a full backup of the file by submitting the file to the deduplicating storage system using the new chunk size.

In one embodiment, the computer-implemented method may further include requesting a second chunk size for a second file using an attribute of the second file that corresponds to the attribute of the file and receiving the second chunk size for the second file that differs from the chunk size for the file due to a difference between the attribute of the file and the attribute of the second file.

In one embodiment, a system for implementing the above-described method may include (1) an identification module, stored in memory, that identifies a file to be divided into chunks for deduplication, (2) a requesting module, stored in memory, that requests, from a server, a chunk size to use when dividing the file for deduplication by submitting at least one attribute of the file to the server, the server selecting the chunk size based at least in part on a projected chunk reuse rate when the file is deduplicated according to the chunk size, (3) a receiving module, stored in memory, that receives from the server, in response to requesting the chunk size, the chunk size to use when dividing the file for deduplication, (4) a division module, stored in memory, that divides the file for deduplication into a group of chunks according to the chunk size, and (5) at least one physical processor configured to execute the identification module, the requesting module, the receiving module, and the division module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a file to be divided into chunks for deduplication, (2) request, from a server, a chunk size to use when dividing the file for deduplication by submitting at least one attribute of the file to the server, the server selecting the chunk size based at least in part on a projected chunk reuse rate when the file is deduplicated according to the chunk size, (3) receive from the server, in response to requesting the chunk size, the chunk size to use when dividing the file for deduplication, and (4) divide the file for deduplication into a group of chunks according to the chunk size.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
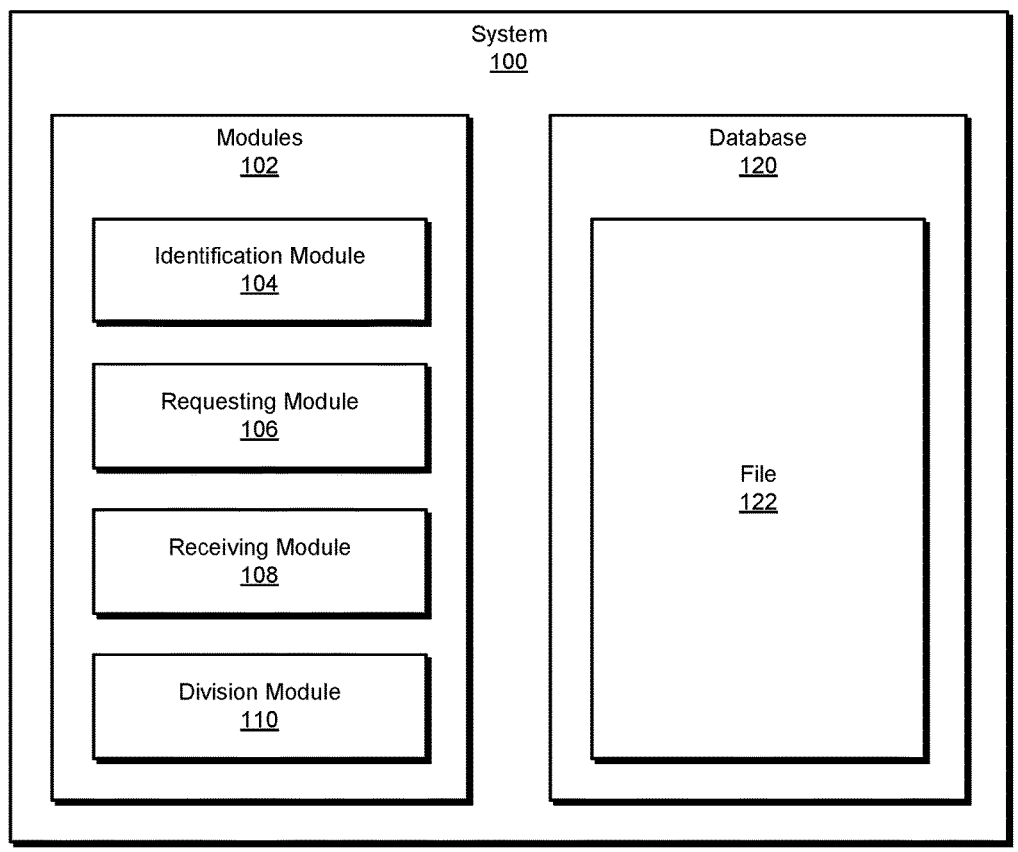
FIG. 1 is a block diagram of an exemplary system for efficient backup deduplication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficient backup deduplication. As will be explained in greater detail below, by selecting deduplication chunk sizes for backup files to be deduplicated based on attributes of the backup files (e.g., using machine learning systems to determine optimal deduplication chunk sizing for files of given attributes). In some examples, these systems and methods may gather information about deduplication efficacy of files with given attributes at various chunk sizes from various disparate client systems.

The following will provide, with reference to FIGS. 1, 2, 4, and 5, detailed descriptions of exemplary systems for efficient backup deduplication. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for efficient backup deduplication. As illustrated in this figure, exemplary system 100 may include one or more modules 102 for performing one or more tasks. For example, and as will be explained in greater detail below, exemplary system 100 may include an identification module 104 that identifies a file to be divided into chunks for deduplication. Exemplary system 100 may additionally include a requesting module 106 that requests, from a server, a chunk size to use when dividing the file for deduplication by submitting at least one attribute of the file to the server, the server selecting the chunk size based at least in part on a projected chunk reuse rate when the file is deduplicated according to the chunk size. Exemplary system 100 may also include a receiving module 108 that receives from the server, in response to requesting the chunk size, the chunk size to use when dividing the file for deduplication. Exemplary system 100 may additionally include a division module 110 that divides the file for deduplication into a plurality of chunks according to the chunk size. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a file 122.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
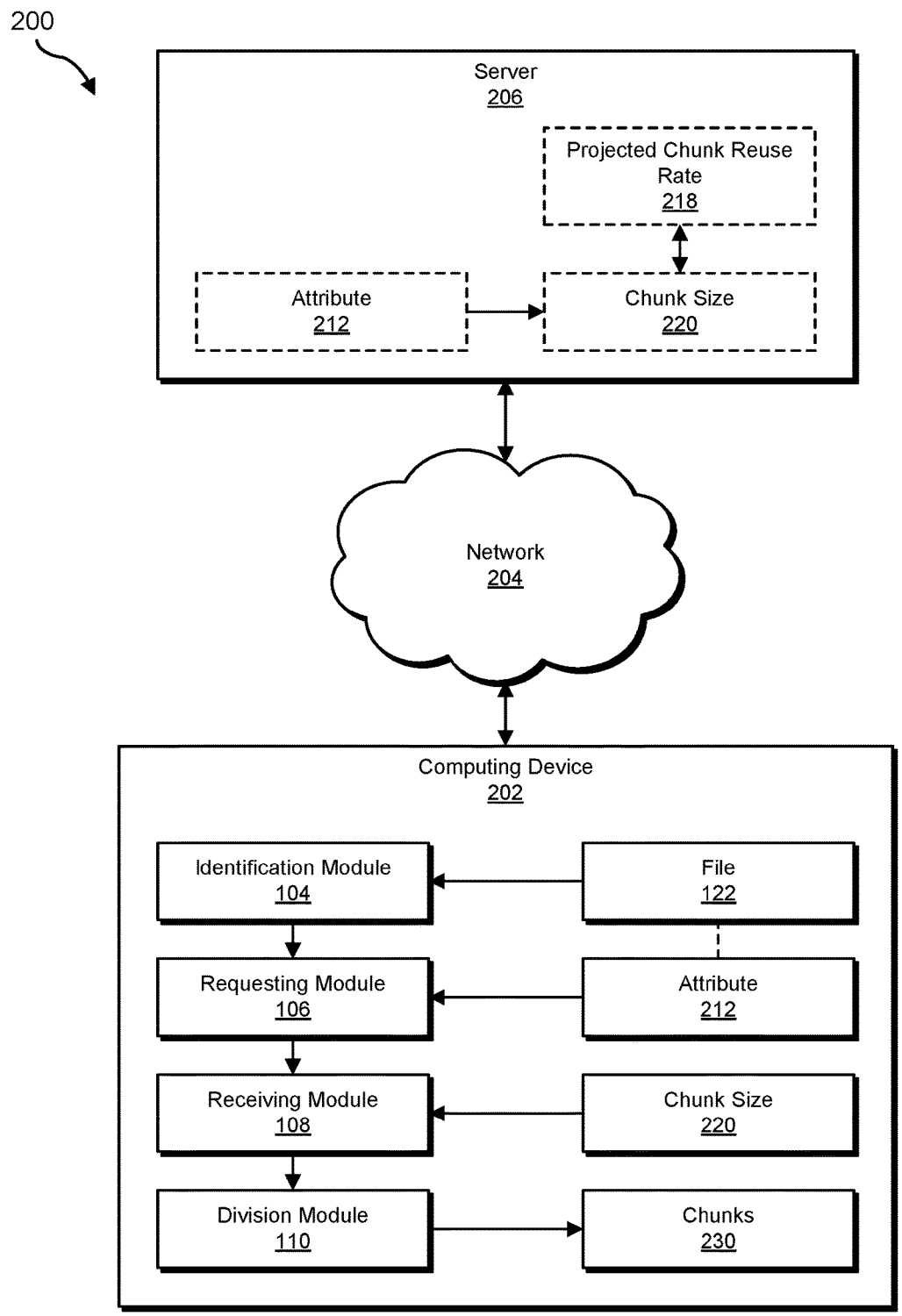
FIG. 2 is a block diagram of an additional exemplary system for efficient backup deduplication.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to efficiently deduplicate backup data. For example, and as will be described in greater detail below, one or more of modules 102 may cause computing device 202 and/or server 206 to efficiently deduplicate a backup of file 122. For example, and as will be described in greater detail below, identification module 104 may identify file 122 to be divided into chunks for deduplication. Requesting module 106 may request, from server 206, a chunk size 220 to use when dividing file 122 for deduplication by submitting at least one attribute 212 of file 122 to server 206, server 206 selecting chunk size 220 based at least in part on a projected chunk reuse rate 218 when file 122 is deduplicated according to chunk size 220. Receiving module 108 may receive from server 206, in response to requesting chunk size 220, chunk size 220 to use when dividing file 122 for deduplication. Division module 110 may divide file 122 for deduplication into a plurality of chunks 230 according to chunk size 220.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing data, deduplicating data, and/or reading computer-executable instructions. Examples of server 206 include, without limitation, application servers and database servers configured to provide various database services and/or run certain software applications. In some examples, server 206 may represent one or more computing devices within a computing platform and/or providing a computing service.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
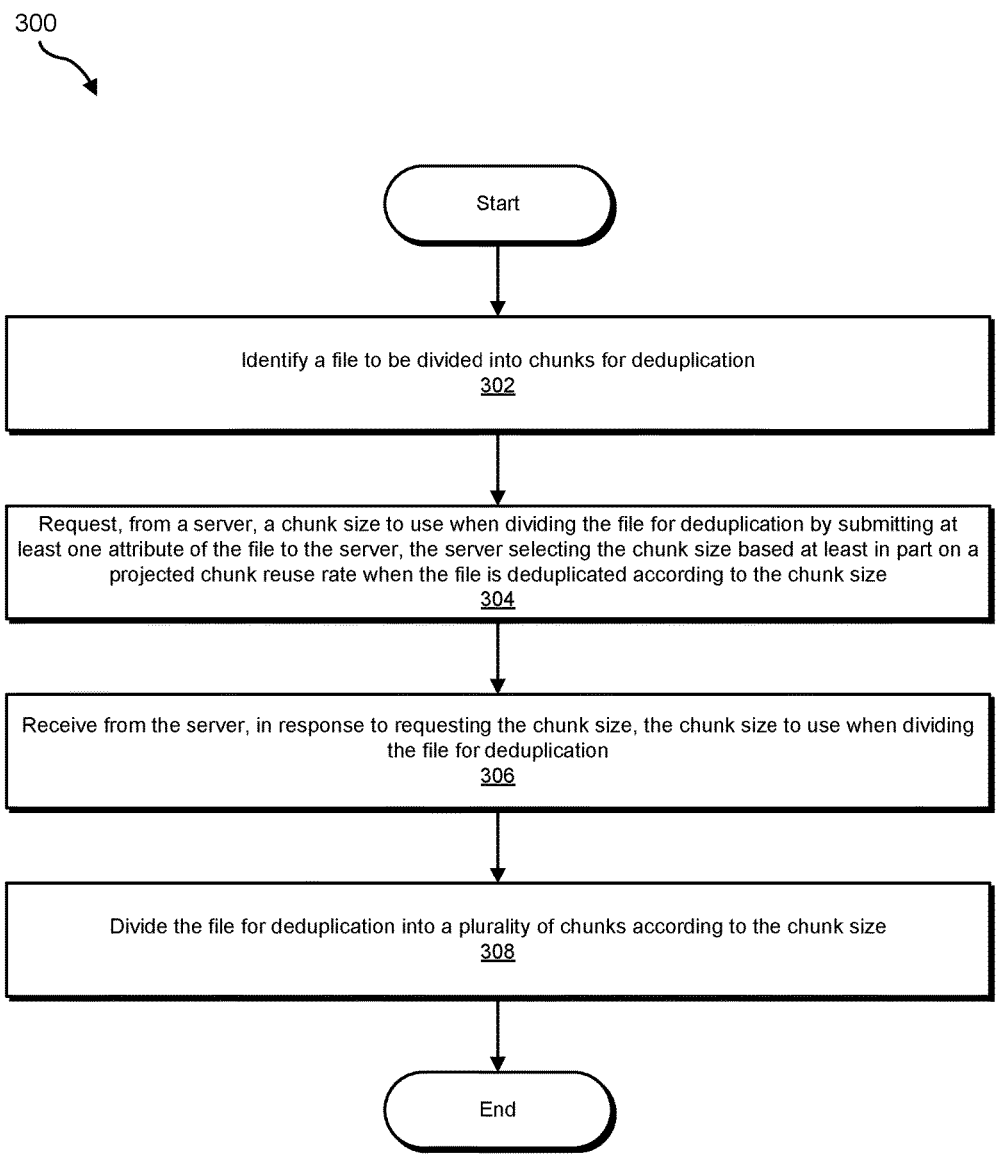
FIG. 3 is a flow diagram of an exemplary method for efficient backup deduplication.

FIG. 3 is a flow diagram of an exemplary computer-implemented method 300 for efficient backup deduplication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a file to be divided into chunks for deduplication. For example, identification module 104 may, as part of computing device 202 in FIG. 2, identify file 122 to be divided into chunks for deduplication.

The term "file," as used herein, may refer to any suitable unit of data, including, without limitation, a file, data object, extent, database, database entry, and/or electronic document.

The term "chunk," as used herein, may refer to any portion of a file that may be subject to deduplication. Examples of chunks include, without limitation, data segments and data blocks. In some examples, the term "chunk" may refer to a fixed-length portion of a given file. For example, a file may be represented as a series of chunks of the same length.

The term "deduplication," as used herein, may refer to any approach to storing data that reduces redundant data by only storing non-redundant instances of data (e.g., unique chunks), potentially referencing each chunk multiple times. For example, multiple backups of a file may each include a chunk of data in the file that is identical across the backups. Accordingly, a deduplicating system may store only one instance of the chunk and reference that instance for each backup of the file instead of separately storing the chunk for each backup of the file.

Identification module 104 may identify the file to be divided into chunks for deduplication in any suitable context. For example, identification module 104 may identify the file in the context of a backup. For example, identification module 104 may determine that the file is to be backed up. In some examples, identification module 104 may determine that the file has yet to be backed up and/or stored in a deduplication system for backups. Additionally or alternatively, identification module 104 may determine that the file has previously been backed up and stored in a deduplication system but that the file is subject to a different chunking size. In some examples, identification module 104 may identify the file to be divided into chunks before submitting the chunks to a deduplicating data system (e.g., by submitting fingerprints of the chunks for comparison in the deduplicating data system and chunks identified as unique by the deduplicating data system to the deduplicating data system).

Returning to FIG. 3, at step 304, one or more of the systems described herein may request, from a server, a chunk size to use when dividing the file for deduplication by submitting at least one attribute of the file to the server, the server selecting the chunk size based at least in part on a projected chunk reuse rate when the file is deduplicated according to the chunk size. For example, requesting module 106 may, as part of computing device 202 in FIG. 2, request, from server 206, chunk size 220 to use when dividing file 122 for deduplication by submitting at least one attribute 212 of file 122 to server 206, server 206 selecting chunk size 220 based at least in part on projected chunk reuse rate 218 when file 122 is deduplicated according to chunk size 220.

The term "server," as used herein, may refer to any computing device, system, and/or platform that may select and provide a chunk size for use in chunk-based deduplication. In some examples, the term "server" may refer to an application and/or service. In some examples, the server may include and/or operate as a part of a deduplication storage system and/or a backup system. Additionally or alternatively, the server may interface with a deduplication storage system and/or a backup system. In some examples, the server may provide one or more deduplication services and/or backup services to multiple clients (e.g., that are separately owned).

As used herein, the term "attribute," as it relates to files, may refer to any metadata that describes a file. For example, the attribute may include a file type of the file. As used herein, the term "file type" may refer to any file format (e.g., a MICROSOFT OUTLOOK PST file) and/or classification of content type of a file (e.g., an email storage file). Additionally or alternatively, the attribute may include the application that created the file and/or the application that uses the file (e.g., MICROSOFT OUTLOOK). In some examples, the attribute may include the size of the file, a change in the size of the file, path information of the file, and/or metadata describing a device on which the file is stored (e.g., a storage medium used by the device on which the file is stored, an input/output performance metric of the device on which the file is stored, etc.).

The term "chunk reuse rate," as used herein, may refer to any indicator of an extent of deduplication achieved with respect to a given chunk. For example, the term "chunk reuse rate" may refer to how frequently one or more chunks are referenced for deduplicated storage (e.g., rather instances of the chunks being separately stored). Additionally or alternatively, the term "chunk reuse rate" may refer to an amount of storage space that is saved by referencing the chunks in a deduplication system rather than separately storing instances of the chunks.

Requesting module 106 may request the chunk size in any of a variety of ways. For example, requesting module 106 may request the chunk size from the server by submitting a request that includes the attribute of the file to the server. Additionally or alternatively, requesting module 106 may request the chunk size from the server by submitting the attribute of the file to the server and subsequently submitting a request for a recommended chunk size. In some examples, requesting module 106 may explicitly request the chunk size from the server. Additionally or alternatively, requesting module 106 may implicitly request the chunk size from the server by submitting the attribute of the file to the server and/or by engaging in a protocol with the server for one or more deduplication and/or backup operations that involves the server providing the chunk size to requesting module 106.

The server may select the chunk size in any of a variety of ways. In some examples, the server may select the chunk size based at least in part on the projected chunk reuse rate when the file is deduplicated according to a selection scheme that maximizes the projected chunk reuse rate given a maximum chunk size and that maximizes the chunk size given a maximum projected chunk reuse rate. For example, the server may perform a constrained optimization that optimizes the chunk size selection both with respect to increasing the projected chunk reuse rate and with respect to increasing the chunk size. In one example, the server may apply a penalty (e.g., according to a monotonic penalty function that increases the penalty as the chunk size reduces) to smaller chunk sizes and/or a penalty to lower projected chunk reuse rates. Thus, the server may consistently select a larger chunk size when the larger chunk size does not reduce the projected chunk reuse rate and consistently avoid a smaller chunk size when the smaller chunk size does not increase the projected chunk reuse rate. In some examples, the server may apply a single function that balances the optimality of a larger chunk size with the optimality of a higher projected chunk reuse rate (and, in some examples, one or more additional criteria).

In some examples, the server may select the chunk size based at least in part on the projected chunk reuse rate by identifying a priority assigned to increasing the projected chunk reuse rate, identifying a priority assigned to increasing the chunk size, and selecting the chunk size based on maximizing a combination of the respective priorities. For example, the priorities may be defined as linear weights, as non-linear weight functions (but, e.g., monotonic functions), and/or as hard limits (e.g., no chunk size below a predefined threshold and/or no chunk reuse rate below a predefined threshold).

In some examples, the server may select the chunk size based at least in part on the projected chunk reuse rate by (1) submitting the attribute of the file to a machine learning system that has been trained with a plurality of samples, each sample including an attribute of a corresponding sample file that corresponds to the attribute of the file, a chunk size used for dividing the corresponding sample file for deduplication, and a chunk reuse rate resulting from deduplicating the corresponding sample file using the chunk size and (2) receiving, from the machine learning system, a recommendation indicating the chunk size. The machine learning system may have been trained with samples in any suitable context. For example, the machine learning system may have been trained using observations from one or more previous backup and/or deduplication operations performed by and/or accessed by the server. For example, one or more of the systems described herein may deduplicate backup files and generate samples for the machine learning system that specify the chunk size used for the deduplication, one or more attributes of the backup files, and the chunk reuse rate of the chunks within the files (e.g., across multiple backups).

In some examples, the systems described herein may train the machine learning system using samples derived from a single backup environment. Additionally or alternatively, the plurality of samples used to train the machine learning system may originate from a plurality of subscribers to a deduplication service that may include the machine learning system. For example, a large number of organizations may use a single cloud-based backup and/or deduplication service (e.g., that performs server-side block look-ups for deduplication and/or that stores deduplication metadata server-side). The cloud-based service may generate training samples for a machine learning system from observations of chunk size, file attributes, and chunk reuse rate across the organizations, such that each of the participating organizations benefit from backup deduplication results observed across the participating organizations for purposes of selecting an optimal chunk size.

In some examples, the deduplication service may designate chunk sizes in such a manner as to generate useful samples for statistical analysis (e.g., a machine learning system). For example, the deduplication service may have obtained the plurality of samples at least in part by assigning differing chunk sizes to the plurality of subscribers for use in dividing files with attributes that correspond to the attribute of the file. In this manner, the resulting samples may reflect differing chunk sizes (and the resulting chunk reuse rates), thereby potentially better informing future chunk size recommendations. In some examples, the duplication service may assign differing chunk sizes in response to determining a lack of sample diversity with respect to chunk size (e.g., for files of a given attribute).

Returning to FIG. 3, at step 306, one or more of the systems described herein may receive from the server, in response to requesting the chunk size, the chunk size to use when dividing the file for deduplication. For example, receiving module 108 may, as part of computing device 202 in FIG. 2, receive from server 206, in response to requesting chunk size 220, chunk size 220 to use when dividing file 122 for deduplication.

Receiving module 108 may receive the chunk size in any suitable manner. For example, receiving module 108 may receive the chunk size in association with an identification of a particular file to be deduplicated. Additionally or alternatively, receiving module 108 may receive the chunk size in association with a file attribute (e.g., indicating that files of the designated attribute are to be chunked for deduplication according to the chunk size). In some examples, receiving module 108 may receive a specific chunk size. Additionally or alternatively, receiving module 108 may receive a range of suitable chunk sizes and/or a recommended upper and/or lower limit for chunk sizes.

Returning to FIG. 3, at step 308, one or more of the systems described herein may divide the file for deduplication into a plurality of chunks according to the chunk size. For example, division module 110 may, as part of computing device 202 in FIG. 2, divide file 122 for deduplication into plurality of chunks 230 according to chunk size 220.

Division module 110 may divide the file for deduplication into chunks in any suitable manner. For example, division module 110 may, starting from the beginning of the file, read from the file until a segment of the file that reaches the chunk size has been read. Division module 110 may then repeat this process starting from the end of the last-read segment.

In some examples, division module 110 may back up the file by submitting at least a portion of the plurality of chunks to a deduplicating storage system. For example, division module 110 may generate a fingerprint (e.g., a hash) of each chunk and submit the fingerprint to a deduplication system (e.g., the server). The deduplication system may then, based on the fingerprint, determine whether the chunk represents a new chunk (e.g., a chunk that is not already stored by the deduplication system) or if the chunk represents a previously stored chunk. If the chunk represents a new chunk, division module 110 may send the chunk to the deduplication system for the deduplication system to store. If the chunk represents a previously stored chunk, the deduplication system may create a reference (e.g., associated with a location in the file from which division module 110 extracted the chunk) to the previously stored chunk.

In some examples, once the deduplication storage system stores a deduplicated backup of the file, the systems described herein may use information about the deduplication of the file to assign future chunk sizes. For example, the deduplicating storage system may determine, based on backing up the file, a chunk reuse rate of the file and use the chunk reuse rate to calculate a projected chunk reuse rate for an additional file based on an attribute of the additional file that corresponds to the attribute of the file. In one example, the systems described herein may create a sample based on the file that includes a chunk size used to chunk the file, a chunk reuse rate, and one or more attributes of the file, and use the sample in a statistical analysis (e.g., use the sample to train a machine learning system). In this manner, the systems described herein may project the chunk reuse rate of future files to be deduplicated (e.g., across multiple backups of the files) in relation to various chunk sizes and file attributes.

As may be appreciated, the systems described herein may recommend different chunk sizes for files with different attributes. Accordingly, in one example, systems described herein may request a second chunk size for a second file using an attribute of the second file that corresponds to the attribute of the file and receiving the second chunk size for the second file that differs from the chunk size for the file due to a difference between the attribute of the file and the attribute of the second file. For example, systems described herein may determine that the chunk reuse rate for a PST file chunked at a given chunk size typically differs from the chunk reuse rate of a log file chunked at the same chunk size. Accordingly, optimal chunk sizes for PST files may differ from optimal chunk sizes for log files.

In some examples, after backing up a file to deduplicated storage, the systems described herein may use the same chunk size for subsequent backups of the file (e.g., so that duplicate chunks across the backups of the file can be deduplicated in storage). However, in some examples, one or more attributes of the file used to determine the optimal chunk size for the file may change. For example, the attributes used to determine the optimal chunk size may include the file size of the file. Additionally or alternatively, a backend system that recommended the chunk size for the file may update to use a more refined model for determining the optimal chunk size for a file with the given attributes (e.g., due to incorporating more observations as training samples to a machine learning system). Accordingly, in some examples the systems described herein may provide a new chunk size for the file. For example, systems described herein may (1) determine that a size of the file has increased after backing up the file, (2) in response to determining that the size of the file has increased (i) request a new chunk size for dividing the file for deduplication and (ii) perform a full backup of the file by submitting the file to the deduplicating storage system using the new chunk size.

Figure 4:
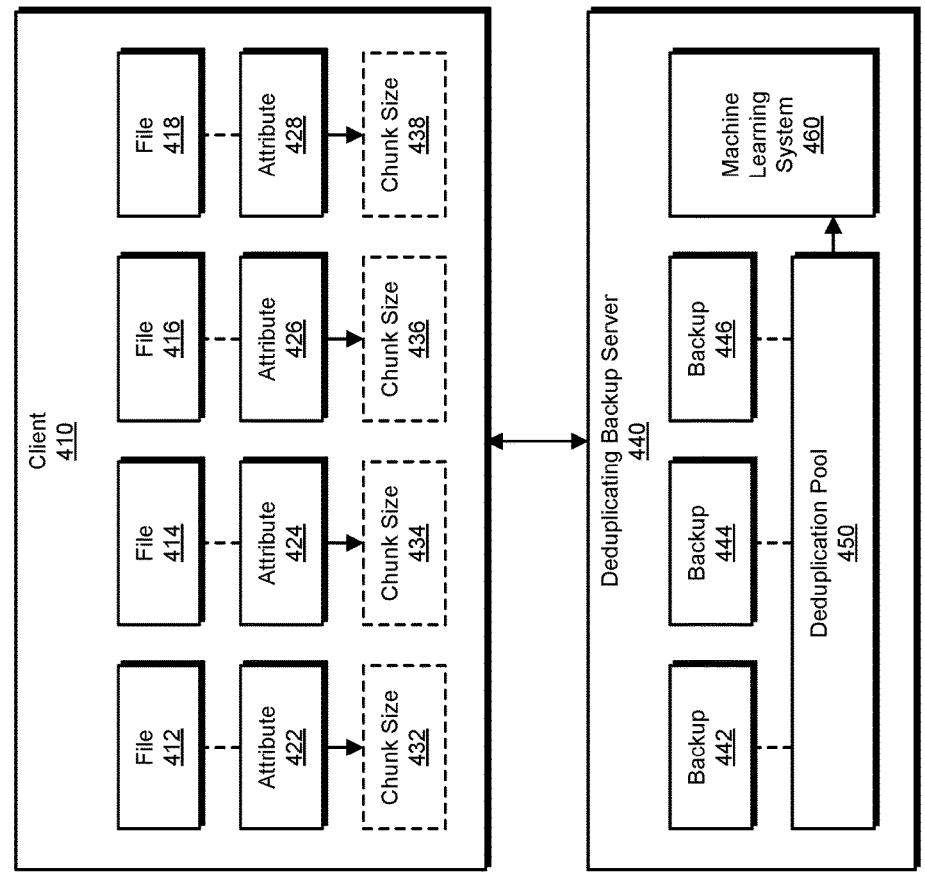
FIG. 4 is a block diagram of an exemplary computing system for efficient backup deduplication.

To provide an example of a system for efficient backup deduplication, FIG. 4 illustrates an exemplary system 400. As shown in FIG. 4, system 400 may include a client 410 and a deduplicating backup server 440. In one example, client 410 may store and/or manage files 412, 414, 416, and 418 (e.g., as a host system and/or as a client-side backup system). Deduplicating backup server 440 may perform one or more backup and/or deduplication operations to store deduplicated backups for client 410 (e.g., backups of files 412, 414, 416, and/or 418). For example, client 410 may perform a backup of files 412, 414, 416, 418 to deduplicating backup server 440, resulting in a backup 442. Client 410 may also perform subsequent backups 444 and 446 of files 412, 414, 416, and 418.

In order to facilitate an efficient backup and deduplication process, the systems described herein may minimize the amount of data to be transferred by client 410 and stored by deduplicating backup server 440 in a deduplication pool 450 by maximizing chunk reuse rates (e.g., by ensuring that chunk sizes for files 412, 414, 416, and 418 are sufficiently small) and minimize deduplicating processing and metadata storage overhead (e.g., by ensuring that chunk sizes for files 412, 414, 416, and 418 are sufficiently large). Accordingly, before performing backup 442, client 410 may provide attributes 422, 424, 426, and 428 of files 412, 414, 416, and 418, respectively, to deduplicating backup server 440. Deduplication backup server 440 may provide attributes 422, 424, 426, and 428 to machine learning system 460 (which has been trained, e.g., with samples specifying file attributes, chunk sizes, and chunk reuse rates). Machine learning system 460 may produce chunk sizes 432, 434, 436, and 438 in response to attributes 422, 424, 426, and 428, respectively. Deduplicating backup server 440 may therefore transmit instructions to client 410 that file 412, based on attribute 422, is to be chunked according to chunk size 432; file 414, based on attribute 424, according to chunk size 434; file 416, based on attribute 426, according to chunk size 436; and file 418, based on attribute 428, according to chunk size 438. Client 410 may chunk files 412, 414, 416, and 418 according to chunk sizes 432, 434, 436, and 438, respectively. Client 410 may then transmit chunks of files 412, 414, 416, and 418 to deduplicating backup server 440 to create backup 442 that references the chunks in deduplication pool 450. On a subsequent backup, client 410 may chunk the new versions of files 412, 414, 416, and 418 according to the same respective chunk sizes 432, 434, 436, and 438 and transmit chunk fingerprints and/or chunks of files 412, 414, 416, and 418 to deduplicating backup server 440 as necessary. Deduplicating backup server 440 may thereby create backup 444 that references chunks in deduplication pool 450, including chunks previously stored for backup 442. Likewise, on a subsequent backup, deduplicating backup server 440 may create backup 446 that references chunks in deduplication pool 450, including chunks previously stored for backup 446. In this manner, the systems described herein may efficiently store deduplicated backups of files with different attributes according to the optimal chunk sizes indicated by the file attributes.

Figure 5:
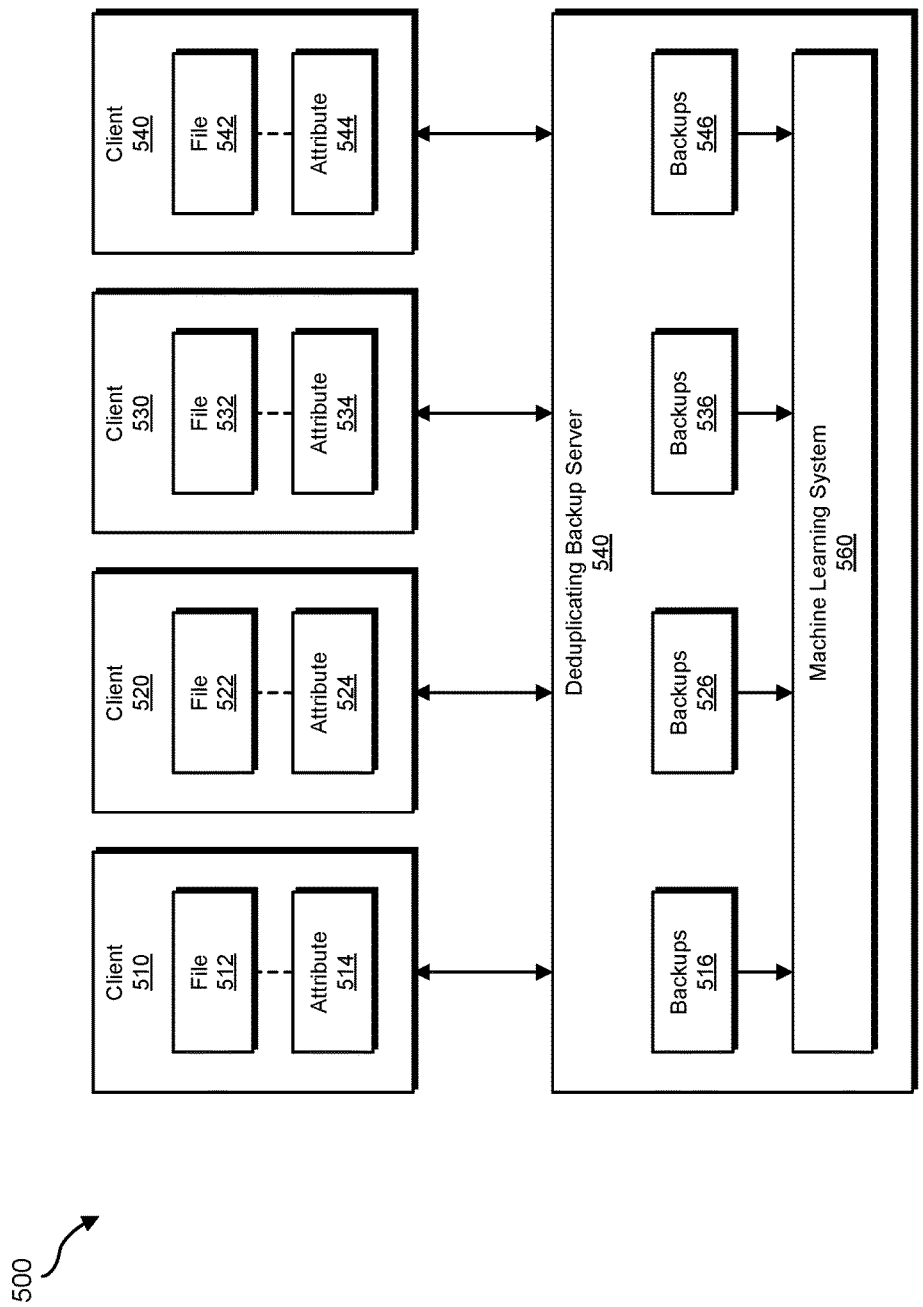
FIG. 5 is a block diagram of an exemplary computing system for efficient backup deduplication.

To provide an example of a system for efficient backup deduplication leveraging information from multiple clients, FIG. 5 illustrates an exemplary system 500. As shown in FIG. 5, system 500 may include clients 510, 520, 530, and 540 and a deduplicating backup server 540. As shown in FIG. 5, clients 510, 520, 530, and 540 may store files 512, 522, 532, and 542, respectively. Files 512, 522, 532, and 542 may be describable by attributes 514, 524, 534, and 544, respectively. In one example, client 510 may perform a series of backups 516 of file 512; client 520 may perform a series of backups 526 of file 522; client 530 may perform a series of backups 536 of file 532; and client 540 may perform a series of backups 546 of file 542. As deduplicating backup server 540 performs deduplications for backups 516, 526, 536, and 546, deduplicating backup server 540 may train a machine learning system 560 on samples derived from backups 516, 526, 536, and 546. For example, when deduplicating backup server 540 performs deduplications for a backup in backups 516, deduplicating backup server may generate a sample that includes attribute 514, the size of chunks sent by client 510 and stored by deduplicating backup server 540 for file 512, and a chunk reuse rate achieved in the deduplication of file 512 across backups 516. In one example, attribute 524 may match attribute 514 and client 520 may initiate the first of backups 526 after machine learning system 560 has been trained on backups 516. Accordingly, deduplicating backup server 540 may submit attribute 524 to machine learning system 560 to determine an optimal chunk size for file 522. Likewise, the deduplication results of backups 526 may further train machine learning system 560. In a further example, attribute 544 may match attributes 514, 524, and 534 and client 540 may initiate the first of backups 546 after machine learning system 560 has been trained on backups 516, 526, and 536. Accordingly, deduplicating backup server 540 may submit attribute 544 to machine learning system 560 to determine an optimal chunk size for file 542. Client 540 may therefore benefit from an analysis of the deduplication of files 512, 522, and 532 across backups 516, 526, and 536, respectively, when chunking file 542 for deduplicated backup.

As explained above in connection with method 300 in FIG. 3, when a large file needs to be backed up, a backup client may request a block size from a backend service based on file attributes such as the file type and/or file size. The backend service may select a block size using a predictive model based on the file type and/or size of the file. Initially, each request to the backend may result in a different block size for the same file size and file type.

The backup client may then break up the large file into many smaller blocks based on the chosen block size and back up each block in the cloud. When the same file is updated by a customer and backed up again, the backup client may break up the file using the same block size. Before backing up each block, the backup client may consult the cloud service to see whether an existing block can be reused. The backup client may back up the new block to the cloud only when the block doesn't yet exist in the cloud. The systems described herein may calculate a reusability factor (e.g., the percentage of reusable blocks over the total number of blocks) for each backup operation and save the reusability factor in the cloud. These systems may group the reusability factor based on file type, file size, and/or other attributes.

After the systems described herein have gathered sufficient crowd-sourced data to build a reliable predictive model (e.g., of reusability factors for block sizes given file attributes such as file type and file size) through machine learning (e.g., clustering and/or classification), the systems described herein may use the predictive model going forward to optimize the block size when backing up large files.

Once the systems described herein determine a block size for a particular file, the determined block size may be reused for subsequent backups. However, when a file grows large enough and a new block size is deemed more optimal, these systems may back up the entire file using the new block size so subsequent backups can have a higher reusability factor, thereby saving bandwidth and storage. The systems described herein may continuously collect reusability statistics for each backup performed and the cloud service may continue to refine the predictive model for selecting block sizes based on collected data.

By building a predictive model that continuously optimizes block size based on crowd-sourced data, the systems described herein may use the optimal block size to backup large files to achieve high block reusability as well as high performance by saving bandwidth and storage cost. In addition, by moving block comparison and file metadata management to the cloud, these systems may improve client performance and reduce local storage requirements for deduplication. In some examples, by determining that a certain file attributes indicate that there is little prospect of deduplication for a file (e.g., a video file of a certain format that is unlikely to contain duplicate chunks of data across different versions), the systems described herein may determine that a large block size is optimal, thereby saving computing resources that would otherwise be spent in generating, storing metadata for, and check for duplicates among many small blocks.

Figure 6:
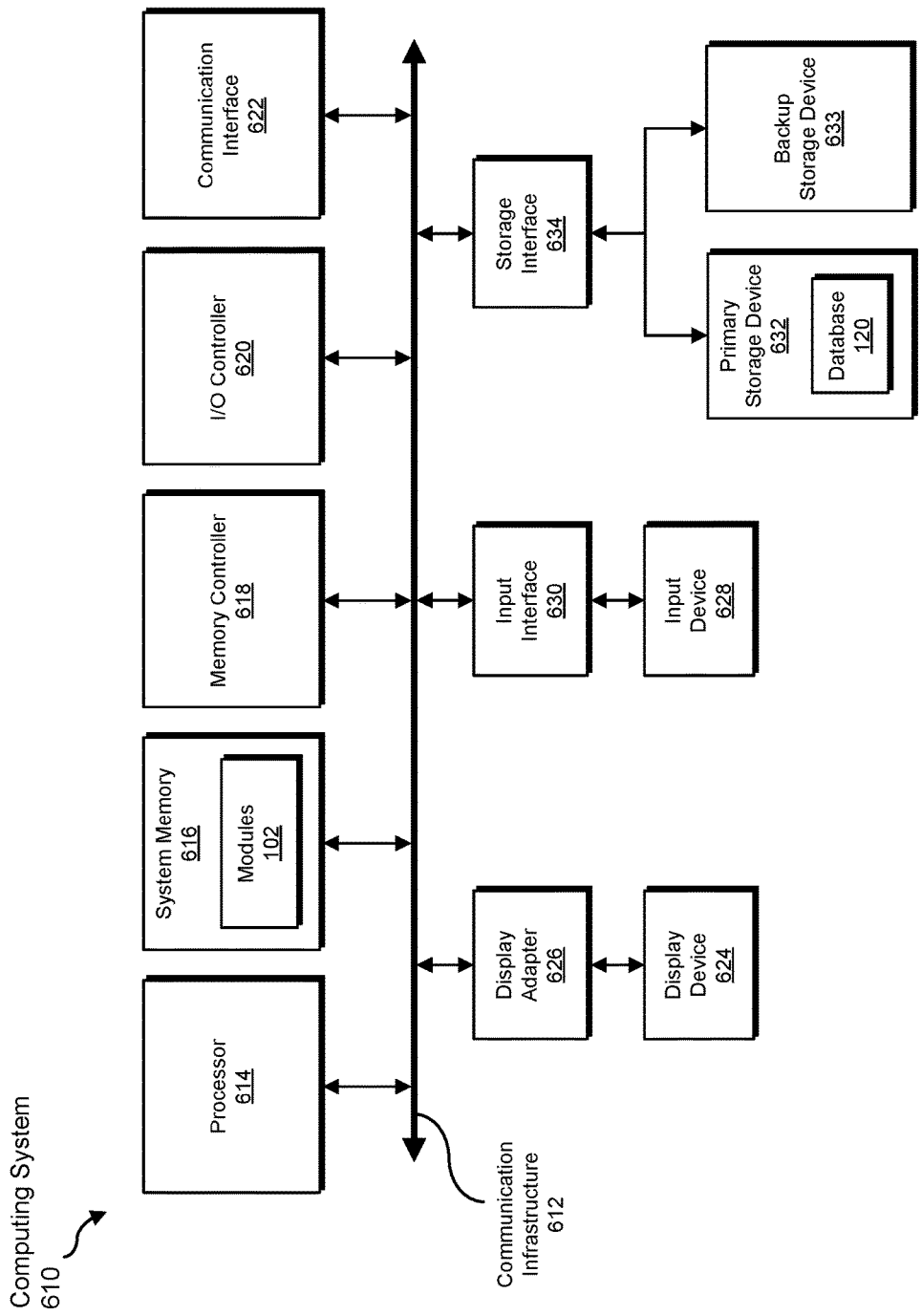
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
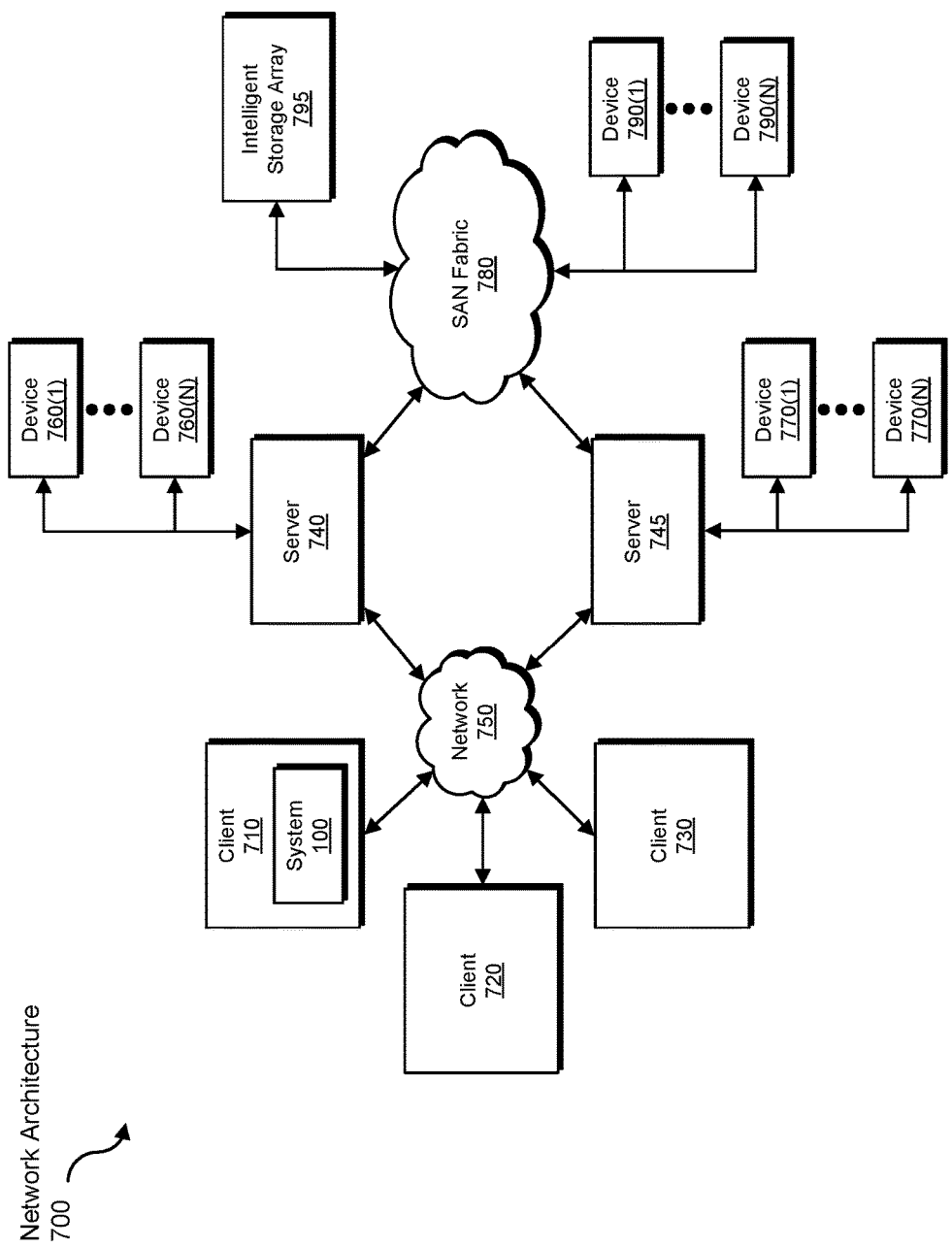
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for efficient backup deduplication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive file data to be transformed, transform the file data, output a result of the transformation to a backup client, use the result of the transformation to divide the file into chunks, and store the result of the transformation to a deduplicating backup system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficient backup deduplication, at least a portion of the method being performed by a computing device comprising at least one processor, the method comprising:
   identifying a file to be divided into chunks for deduplication;
   requesting, from a server, a chunk size to use when dividing the file for deduplication by submitting at least one attribute of the file to the server, the server selecting the chunk size based at least in part on a projected chunk reuse rate when the file is deduplicated according to the chunk size;
   receiving from the server, in response to requesting the chunk size, the chunk size to use when dividing the file for deduplication;
   dividing the file for deduplication into a plurality of chunks according to the chunk size, thereby reducing memory storage requirements in the computing device.

2. The computer-implemented method of claim 1, wherein selecting the chunk size based at least in part on the projected chunk reuse rate when the file is deduplicated according to a selection scheme that maximizes the projected chunk reuse rate given a maximum chunk size and that maximizes the chunk size given a maximum projected chunk reuse rate.

3. The computer-implemented method of claim 1, wherein selecting the chunk size based at least in part on the projected chunk reuse rate comprises:
   identifying a first priority assigned to increasing the projected chunk reuse rate;
   identifying a second priority assigned to increasing the chunk size;
   selecting the chunk size based on maximizing a combination of the first priority and the second priority.

4. The computer-implemented method of claim 1, wherein selecting the chunk size based at least in part on the projected chunk reuse rate comprises:
   submitting the attribute of the file to a machine learning system that has been trained with a plurality of samples, each sample comprising an attribute of a corresponding sample file that corresponds to the attribute of the file, a chunk size used for dividing the corresponding sample file for deduplication, and a chunk reuse rate resulting from deduplicating the corresponding sample file using the chunk size;
   receiving, from the machine learning system, a recommendation indicating the chunk size.

5. The computer-implemented method of claim 4, wherein the plurality of samples used to train the machine learning system originate from a plurality of subscribers to a deduplication service that comprises the machine learning system.

6. The computer-implemented method of claim 5, wherein the deduplication service obtained the plurality of samples at least in part by assigning differing chunk sizes to the plurality of subscribers for use in dividing files with attributes that correspond to the attribute of the file.

7. The computer-implemented method of claim 1, wherein the attribute comprises at least one of:
   a file type of the file;
   an application that created the file;
   an application that uses the file.

8. The computer-implemented method of claim 1, wherein the attribute comprises a size of the file.

9. The computer-implemented method of claim 1, further comprising backing up the file by submitting at least a portion of the plurality of chunks to a deduplicating storage system.

10. The computer-implemented method of claim 9, wherein the deduplicating storage system determines, based on backing up the file, a chunk reuse rate of the file and uses the chunk reuse rate to calculate a projected chunk reuse rate for an additional file based on an attribute of the additional file that corresponds to the attribute of the file.

11. The computer-implemented method of claim 9, further comprising:
   determining that a size of the file has increased after backing up the file;
   in response to determining that the size of the file has increased:
   requesting a new chunk size for dividing the file for deduplication;
   performing a full backup of the file by submitting the file to the deduplicating storage system using the new chunk size.

12. The computer-implemented method of claim 1, further comprising:

requesting a second chunk size for a second file using an attribute of the second file that corresponds to the attribute of the file;

receiving the second chunk size for the second file that differs from the chunk size for the file due to a difference between the attribute of the file and the attribute of the second file.

13. A system for efficient backup deduplication, the system comprising:

an identification module, stored in memory, that identifies a file to be divided into chunks for deduplication;

a requesting module, stored in memory, that requests, from a server, a chunk size to use when dividing the file for deduplication by submitting at least one attribute of the file to the server, the server selecting the chunk size based at least in part on a projected chunk reuse rate when the file is deduplicated according to the chunk size;

a receiving module, stored in memory, that receives from the server, in response to requesting the chunk size, the chunk size to use when dividing the file for deduplication;

a division module, stored in memory, that divides the file for deduplication into a plurality of chunks according to the chunk size, thereby reducing memory storage requirements in the system;

at least one physical processor configured to execute the identification module, the requesting module, the receiving module, and the division module.

14. The system of claim 13, wherein the server selects the chunk size based at least in part on the projected chunk reuse rate when the file is deduplicated according to a selection scheme that maximizes the projected chunk reuse rate given a maximum chunk size and that maximizes the chunk size given a maximum projected chunk reuse rate.

15. The system of claim 13, wherein the server selects the chunk size based at least in part on the projected chunk reuse rate by:

identifying a first priority assigned to increasing the projected chunk reuse rate;

identifying a second priority assigned to increasing the chunk size;

selecting the chunk size based on maximizing a combination of the first priority and the second priority.

16. The system of claim 13, wherein the server selects the chunk size based at least in part on the projected chunk reuse rate by:

submitting the attribute of the file to a machine learning system that has been trained with a plurality of samples, each sample comprising an attribute of a corresponding sample file that corresponds to the attribute of the file, a chunk size used for dividing the corresponding sample file for deduplication, and a chunk reuse rate resulting from deduplicating the corresponding sample file using the chunk size;

receiving, from the machine learning system, a recommendation indicating the chunk size.

17. The system of claim 16, wherein the plurality of samples used to train the machine learning system originate from a plurality of subscribers to a deduplication service that comprises the machine learning system.

18. The system of claim 17, wherein the deduplication service obtained the plurality of samples at least in part by assigning differing chunk sizes to the plurality of subscribers for use in dividing files with attributes that correspond to the attribute of the file.

19. The system of claim 13, wherein the attribute comprises at least one of:

a file type of the file;

an application that created the file;

an application that uses the file.

20. A non-transitory computer-readable medium comprising one or more computer-readable instructions that, when executed by at least one processor of a computing device, cause the computing device to:

identify a file to be divided into chunks for deduplication;

request, from a server, a chunk size to use when dividing the file for deduplication by submitting at least one attribute of the file to the server, the server selecting the chunk size based at least in part on a projected chunk reuse rate when the file is deduplicated according to the chunk size;

receive from the server, in response to requesting the chunk size, the chunk size to use when dividing the file for deduplication;

divide the file for deduplication into a plurality of chunks according to the chunk size, thereby reducing memory storage requirements in the computing device.

* * * * *